D. AUSTIN.
Foot Warmer.
No. 94,060. Patented Aug. 24, 1869.
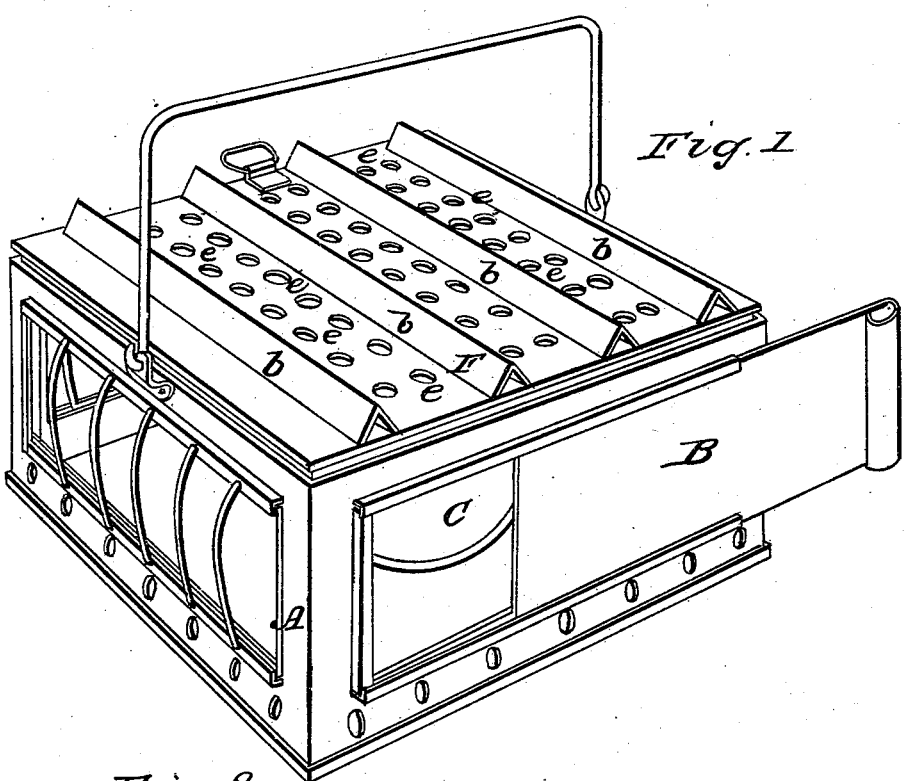
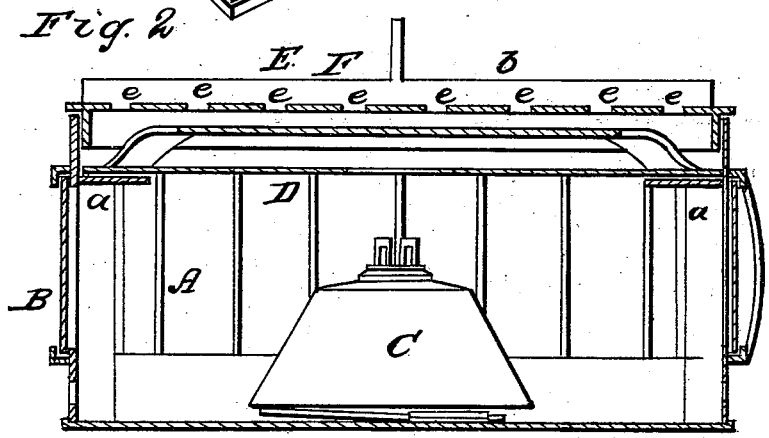
Witnesses
Harry King,
Leopold Evert
Inventor
Dinsmore Austin
per
Leander E. Mason

United States Patent Office.

DINSMORE AUSTIN, OF SHELDON, VERMONT.

Letters Patent No. 94,060, dated August 24, 1869; antedated August 17, 1869.

IMPROVEMENT IN FOOT-WARMERS.

The Schedule referred to in these Letters Patent and making part of the same.

*To all whom it may concern:*

Be it known that I, DINSMORE AUSTIN, of Sheldon, in the county of Franklin, and in the State of Vermont, have invented certain new and useful Improvements in Combined Lantern and Foot-Stove; and do hereby declare that the following is a full, clear, and exact description thereof, reference being had to the accompanying drawings, and to the letters of reference marked thereon.

The nature of my invention consists in the construction and general arrangement of a lantern, which can be used as a foot-stove, and also as a nursery-lamp or furnace.

In order to enable others skilled in the art to which my invention appertains, to make and use the same, I will now proceed to describe its construction and operation, referring to the annexed drawings, which form a part of this specification, and in which—

Figure 1 is a perspective view, and

Figure 2 is a longitudinal vertical section.

A represents a metal box of suitable shape and dimensions, three sides of which are provided with glass, and the fourth with a sliding door, B. The sides of the box A are perforated under the glass and door, as seen in the drawings.

On the bottom of the box A is placed a lamp, C, and upon suitable supports $a\ a$, placed in the sides of the box below the upper edge, is laid a top, D, which has a circular hole through its centre above the flame from the lamp C.

Above and resting on the top D, is a raised roof, E, formed of a metal plate, the corners of which are bent downward, and secured to the top D, leaving a suitable space between said top and the sides or edges of the top E.

On top of the box A is placed a lid or cover, F, which is perforated with a number of holes, $e\ e$, and provided on its upper side with a series of V-shaped projections, $b\ b$, placed point upward.

A lantern thus constructed can, as will be readily seen, be used as a foot-warmer, and by taking off the lid F, it becomes a nursery-lamp or furnace.

The V-shaped plates $b\ b$ on the top of plate F are used for resting the feet upon, and prevent injuring the flat and perforated intermediate spaces in the cover.

The plate F is provided with a suitable handle, so that it may be taken off when the device is intended for heating irons, or other articles placed on the flat plate D.

When the lamp is ignited, the heat passing through the opening in plate D, fills the chamber formed between plates E and D, and escapes at the sides of the former plate, and from thence passes through the perforated plate F, and under the feet.

I am aware that a combined lantern and foot-warmer is not new.

What I claim, is—

The box A, with glass sides and end and door B, lantern C, plates E and D, with hot-air chamber between them, perforated roof F, with V-shaped plates $b\ b$, all constructed and arranged substantially as and for the purposes set forth.

In testimony that I claim the foregoing, I have hereunto set my hand, this 27th day of September, 1868.

DINSMORE AUSTIN.

Witnesses:
MOSES ELWOOD,
EMILY C. AUSTIN.